United States Patent
Takahashi

[19]

[11] Patent Number: 5,772,358
[45] Date of Patent: Jun. 30, 1998

[54] FOOTHOLD

[75] Inventor: Eizo Takahashi, Soka, Japan

[73] Assignee: Miyama Kogyo Kabushiki Kaisha, Saitama-ken, Japan

[21] Appl. No.: 648,663

[22] Filed: May 16, 1996

[30] Foreign Application Priority Data

May 22, 1995 [JP] Japan ..................................... 7-145127

[51] Int. Cl.⁶ .............................. E01C 11/24; E01C 5/00; E04G 3/00
[52] U.S. Cl. ................................ 404/19; 404/34; 404/44; 182/90
[58] Field of Search .................................. 404/19, 34, 44; 182/90, 129, 46, 92; 36/127; 482/52, 79, 80

[56] References Cited

U.S. PATENT DOCUMENTS

| | | |
|---|---|---|
| 601,849 | 4/1898 | Aiken . |
| 2,064,803 | 12/1936 | Grove . |
| 4,100,997 | 7/1978 | Peacock . |
| 4,241,543 | 12/1980 | Foscarini et al. ......................... 52/742 |
| 4,610,330 | 9/1986 | Borst ........................................ 182/90 |
| 4,655,318 | 4/1987 | Bowen ...................................... 182/90 |
| 4,660,681 | 4/1987 | Zenhausern ............................... 182/90 |
| 4,702,349 | 10/1987 | Zenhausern ............................... 182/90 |
| 4,771,861 | 9/1988 | Zenhausern et al. ...................... 182/46 |
| 4,778,032 | 10/1988 | Takahashi . |
| 4,869,342 | 9/1989 | Borst ........................................ 182/90 |

FOREIGN PATENT DOCUMENTS

| | | |
|---|---|---|
| 0 173 227 | 3/1986 | European Pat. Off. ................. 182/90 |
| 4-4040 | 2/1992 | Japan . |
| 470 919 | 8/1937 | United Kingdom . |

*Primary Examiner*—Tamara L. Graysay
*Assistant Examiner*—Gary S. Hartmann
*Attorney, Agent, or Firm*—Flynn, Thiel, Boutell & Tanis, P.C.

[57] ABSTRACT

A foothold of a manhole, a quay, and the like which enables operators to put their feet or foot on a tread in a natural state under a stable condition, and to reduce their fatigue with their feet or knees when they move up and down in a manhole by use of the foothold. The foothold of the manhole, the quay, and the like comprises the tread and side portions continued from and positioned at both sides of the tread, wherein at least the upper surface of the tread is inclined upward from a central portion of the tread toward the side portions at an angle ranging from 1 to 5 degrees.

6 Claims, 2 Drawing Sheets

FOOTHOLD

BACKGROUND OF THE INVENTION

1. Field of the Invention

The present invention relates to a foothold of a manhole, a quay, etc., comprising a tread and side portions continued from and positioned at both sides of the tread.

2. Prior Art

A conventional foothold of a manhole, a quay, etc., of this type is disclosed, for example, in JP-Y 4-4040 in which a tread and side portions continued and positioned at both sides of the tread and they are positioned to be flush with each other when viewed from the side thereof, and the upper surface of the tread is linear and flat.

However the conventional foothold of a manhole has the following problem. That is, when operators move up and down in the manhole by use of a plurality of footholds arranged in the manhole, a quay, etc., they move up and down in an unstable condition where they are liable to miss their footing from the tread and also they are fatigued with their feet or knees since the upper surface of each tread is linear and flat.

SUMMARY OF THE INVENTION

The present invention has been made to solve the aforementioned problem and it is an object of the invention to provide a foothold of a manhole which enables operators to put their feet on the tread in a natural state under a stable condition, and to reduce their fatigue with their feet or knees when they move up and down in the manhole by use of the foothold.

To achieve the above object, a foothold of a manhole, a quay, etc., according to a first aspect of the present invention is characterized in that at least an upper surface of a tread is inclined upward from a central portion of the tread toward side portions of the tread at an angle ranging from 1 to 5 degrees.

A foothold of a first modification of the first aspect of the invention is characterized in that the tread comprises a core and synthetic resin for covering the core, wherein the core is linear and disposed horizontally, while a thickness of the synthetic resin for covering the core is inclined upward from a central portion toward the side portions thereof at an angle ranging from 1 to 5 degrees.

A foothold of a second modification of the first aspect of the invention is characterized in that the tread comprises a core and synthetic resin for covering the core, wherein the core is inclined upward from a central portion toward the side portions thereof at an angle ranging from 1 to 5 degrees, while a thickness of the synthetic resin is uniform at the upper surface thereof.

A foothold of a manhole, a quay, etc., adapted for one foot according to a second aspect of the present invention is characterized in that at least an upper surface of a tread is inclined upward from one side portion toward the other side portion at an angle ranging from 1 to 5 degrees.

Ambulatory physiology acknowledges that unstable walking posture causes people to fatigue or injure their feet or knees if the surface to which they contact is flat when they continue walking while standing for a long time. They can walk stably if the surface to which the feet contact is inclined subtly at an angle of 3 degrees or an angle which is slightly greater or less than 3 degrees.

Since at least the upper surface of the tread is inclined upward from the central portion of the tread toward the side portions thereof at an angle ranging from 1 to 5 degrees, operators hardly miss their footing from the tread and can move up and down in the manhole in a stable condition when they move up and down utilizing many footholds which are installed vertically in the manhole, a quay, etc.

Since at least the upper surface of the tread is inclined upward from one side portion toward the other side portion of the tread at the angle ranging from 1 to 5 degrees in the case of the foothold adapted for one foot, namely, in the case of the foothold on which they keep their footing on the foothold with their foot, each foot contacts the tread of the foothold at a desired angle so that they do not lose or miss their footing from the tread as frequently and can move up and down in the manhole under a stable condition when they move up and down.

PREFERRED EMBODIMENT OF THE INVENTION

Figure 1:
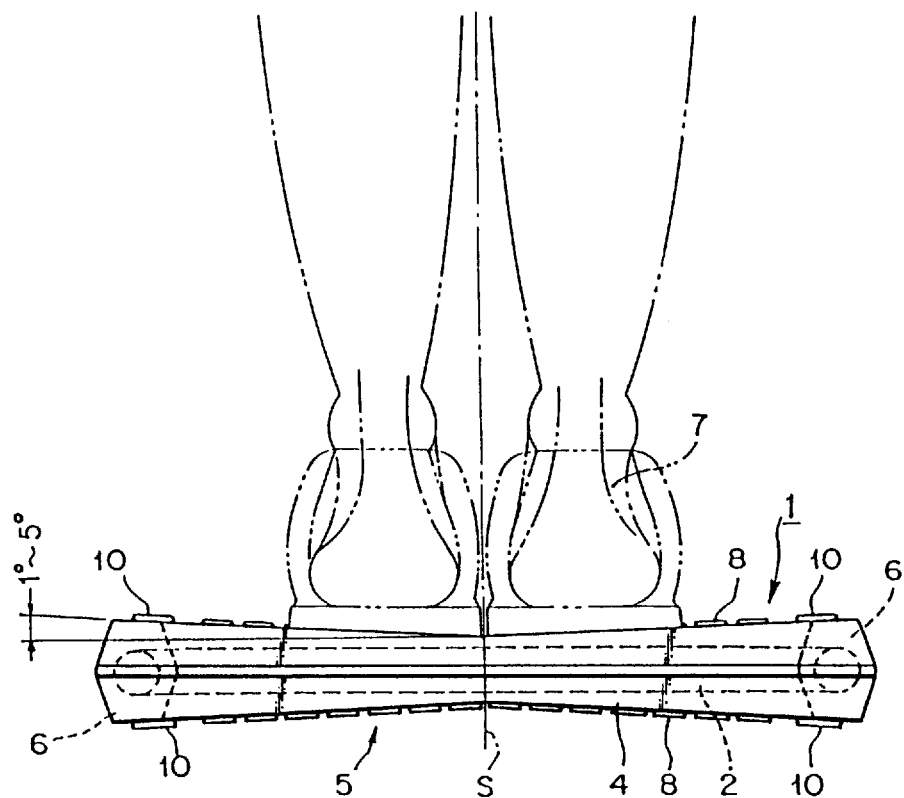
FIG. 1 is a front view of a foothold of a manhole, a quay, etc., according to a first embodiment of the invention.
Figure 2:
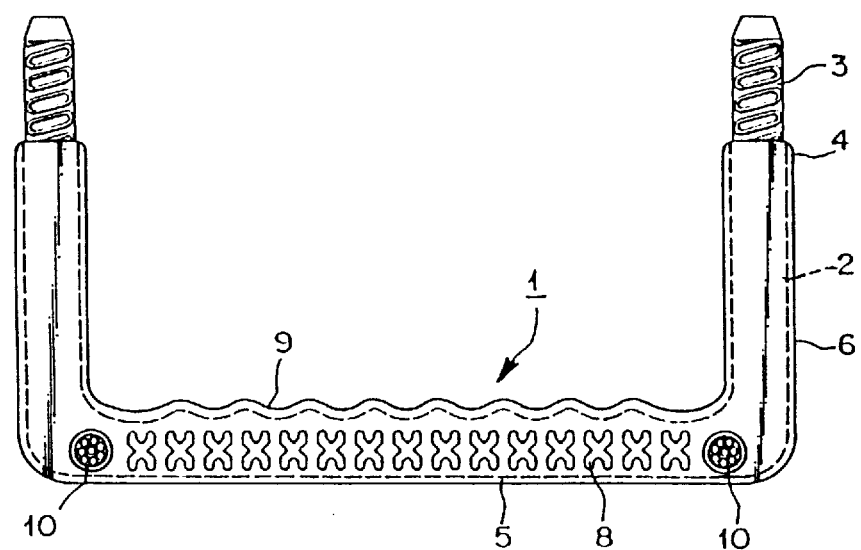
FIG. 2 is a plan view of FIG. 1.

First Embodiment (FIGS. 1 and 2):

In FIG. 1, a foothold 1 comprises a core 2 made of iron and having a U shape when viewed from the plane thereof, legs 3 extending from the core 2, and synthetic resin 4 such as polypropylene for covering the core 2 except a part of each leg 3 in order to prevent the core 2 from being rusted. The foothold 1 is fixed to a manhole in a state where the legs 3 which are not covered by the synthetic resin 4 are embedded into concrete of the manhole.

Denoted by 5 is a tread formed in the foothold 1, and 6 is side portions formed on both sides of the tread 5. The tread 5 has a plurality of slip prevention patterns 8 on the upper surface in the axial direction thereof so as to prevent feet or foot 7 of operators from being slipped. A corrugated grip portion 9 is formed on the upper surface of the tread 5 in its axial direction so that they can grip the tread 5 with their hands. Reflectors 10 are provided on both ends of the tread 5.

As shown in FIG. 1, the tread 5 is structured in such a manner that the horizontal linear core 2 is covered with the synthetic resin 4 at its entire surface. The thickness of the synthetic resin 4 is gradually increased from a central portion toward side portions 6 at an angle ranging from 1 to 5 degrees. The tread 5 has also the slip prevention patterns 8 and the reflectors 10, thereby enabling the foothold 1 to be used reversibly. However, the thickness of the synthetic resin 4 may be uniform at its lower surface and is gradually increased from the central portion S to both side portions 6 only at its upper surface.

Although the horizontal and linear core 2 is employed by the first embodiment, the thickness of the synthetic resin 4 covering the core 2 at the upper surface thereof may be uniform while the core 2 is inclined upward from the central portion S toward the side portions 6 thereof at an angle ranging from 1 to 5 degrees.

Since the foothold 1 is structured as mentioned above, when the operators move up and down utilizing a plurality of footholds 1 which are provided vertically in the manhole, a quay, etc., they put or step their feet or foot 7 alternately on the tread 5 of each foothold 1. Since the tread 5 is inclined upward from the central portion S toward the side portions 6 at the angle of 1 to 5 degrees at least at the upper surface thereof, they can step their feet 7 on the tread 5 in a natural state so that they can move up and down in a stable condition. As a result, they can move up and down without missing their footing on the tread, and hence they are not fatigued with their feet of knees.

Figure 3:
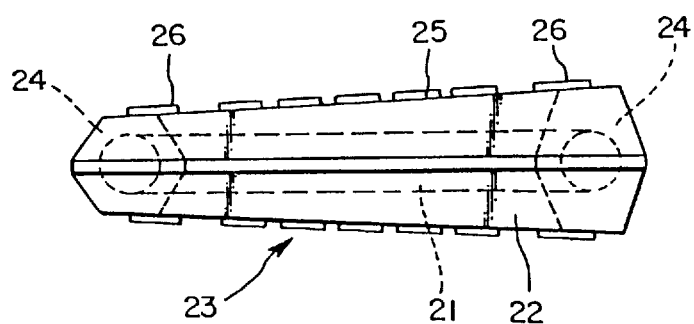
FIG. 3 is a front view of a foothold of a manhole, a quay, etc., according to a second embodiment of the invention.

Second Embodiment (FIG. 3 ):

FIG. 3 shows a foothold 1 adapted for one foot according to a second embodiment of the present invention.

The foothold 1 comprises a core 21 which is made of iron and has a U shape when viewed from the plane thereof, and synthetic resin 22 such as polypropylene for covering the core 21 except a part of legs extended from the core 21 in order to prevent the core 21 from being rusted.

Denoted by 23 is a tread formed in the foothold 1, and 24 is side portions 24 formed on both sides of the tread 23.

The tread 23 has a plurality of slip prevention patterns 25 on the upper surface in the axial direction thereof as to prevent operators from being slipped at their foot 7. Reflectors 26 are provided at both sides of the tread 23. The tread 23 comprises a horizontal linear core 21 and synthetic resin 22 which covers the entire surface of the core 21. The thickness of the synthetic resin 22 is gradually increased upward from one side portion 24 (left side portion in FIG. 3) toward the other side portion 24 (right side portion in FIG. 3) at an angle ranging from 1 to 5 degrees, so as to form the tread 23 adapted for the right foot. The tread 23 also has the slip prevention patterns 25 and the reflectors 26 at its lower surface, whereby the foothold 1 can be used reversibly.

If the foothold 1 is reversed from the state shown in FIG. 3, the lower surface of the tread 23 can be used as the tread 23 adapted for the left leg. However, the thickness of the tread 23 may be made uniform at the lower surface thereof while only the upper surface thereof may be gradually increased from the central portion to the side portions.

Since the foothold 1 is structured as set forth above, when a plurality of foothold are arranged vertically in the manhole in such a manner that those adapted for the right foot are arranged at the right column while those adapted for the left foot are arranged at the left column with alternate arrangement, they can put or step their foot on each inclined tread 23 in a natural state when they move up and down. As a result, they hardly miss their footing on the tread 23 so that they can move up and down at a stable posture. Accordingly, the operators can move up and down while they are not fatigued with their feet of knees.

According to the first aspect of the invention, since the tread is inclined upward from the central portion toward the side portions at the angle of 1 to 5 degrees at least at the upper surface thereof, the operators can put or step their feet or foot on the tread in a natural state so that they can move up and down in a stable condition. As a result, the present invention provides the foothold of a manhole, quay, etc., whereby they can move up and down while they are not fatigued with their feet of knees.

The present invention is not limited to the manhole and the quay as mentioned above but it can be applied to various structures.

According to the second aspect of the invention as disclosed in claim 4, since the tread is inclined upward from one side portion to the other side portion at the angle of 1 to 5 degrees at least at the upper surface thereof, when a plurality of foothold are arranged vertically in the manhole in such a manner that those adapted for the right foot are arranged at the right column while those adapted for the left foot are arranged at the left column with alternate arrangement, they can put or step their foot on each inclined tread in a natural state when they move up and down. As a result, they miss their footing on the tread less frequently so that they can move up and down at a stable posture. Accordingly, the operators can move up and down while they are not fatigued with their feet of knees.

What is claimed is:

1. A foothold comprising a tread and side portions continued and positioned at both sides of the tread, wherein at least an upper surface of the tread is inclined upward from one side portion toward another side portion at an angle ranging from 1 to 5 degrees.

2. The foothold according to claim 1, wherein a lower surface of the tread declines downwardly from the one side portion toward the another side portion at an angle ranging from 1 to 5 degrees.

3. The foothold according to claim 2, wherein at least one of the upper and lower surfaces is provided with means for preventing foot slippage, and reflectors are positioned adjacent respective ends of the tread.

4. The foothold according to claim 1, wherein the angle equals about three degrees.

5. A foothold, comprising an elongate tread having first and second ends, legs cantilevered from the tread and means for fixing the legs to a vertical support surface, the tread increasing in thickness from the first end to the second end, and a first surface of the tread extending from the first end to the second end being inclined at an angle in the range of one to five degrees.

6. The foothold according to claim 5, wherein a second surface of the tread is inclined at an angle in the range of one to five degrees, whereby the tread is reversible and either of the first and second surfaces faces upwardly to receive a person's foot thereon.

* * * * *